Figure 1:
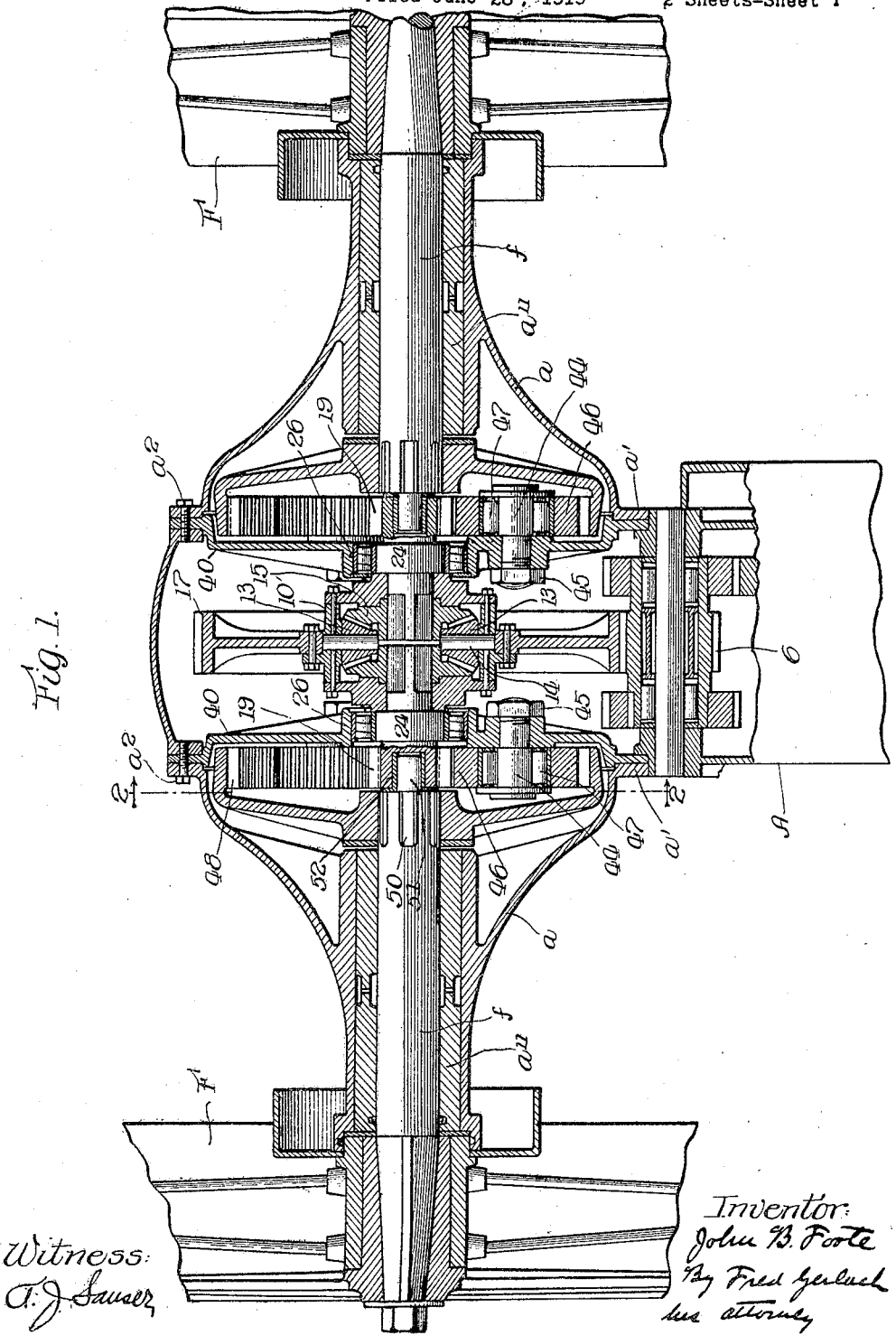

April 15, 1924.

J. B. FOOTE

DRIVING MECHANISM FOR TRACTORS

Filed June 28, 1919

1,490,376

2 Sheets-Sheet 1

Witness
A. J. Sauser

Inventor:
John B. Foote
By Fred Gerlach
his attorney

April 15, 1924.　　　　　　　　　　1,490,376
J. B. FOOTE
DRIVING MECHANISM FOR TRACTORS
Filed June 28, 1919　　　2 Sheets-Sheet 2
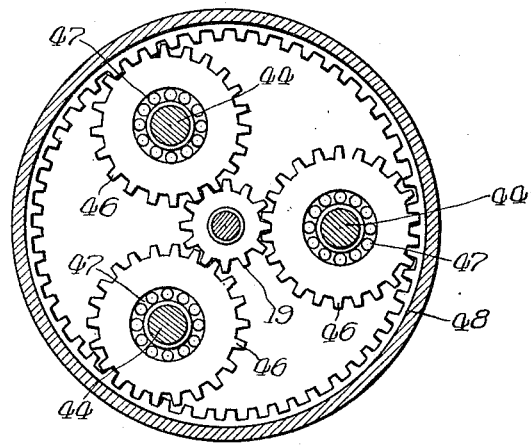
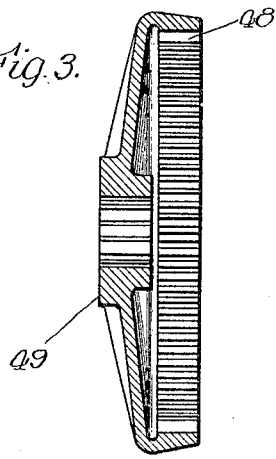
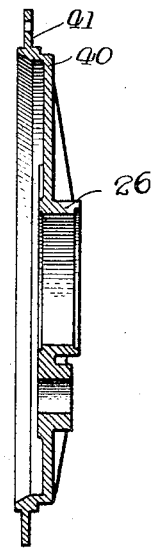
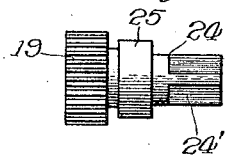
Witness:
A. J. Sauser.
Inventor:
John B. Foote
By Fred Gerlach
his attorney Patented Apr. 15, 1924.

1,490,376

UNITED STATES PATENT OFFICE.

JOHN B. FOOTE, OF OAK PARK, ILLINOIS; JOHN T. KERWIN ADMINISTRATOR OF SAID JOHN B. FOOTE, DECEASED.

DRIVING MECHANISM FOR TRACTORS.

Application filed June 28, 1919. Serial No. 307,388.

*To all whom it may concern:*

Be it known that I, JOHN B. FOOTE, a citizen of the United States, and a resident of Oak Park, in the county of Cook and State of Illinois, have invented certain new and useful Improvements in Driving Mechanism for Tractors, of which the following is a full, clear, and exact description.

The invention relates to driving mechanism for tractors.

One object of the invention is to provide improved reducing gearing between the differential and the traction-wheels, whereby the traction-wheels will be driven at a reduced speed relatively to the differential, the arrangement being such that the differential and reducing gearings are both coaxially disposed with the traction-wheels.

The invention consists in the several novel features hereinafter set forth and more particularly defined by claims at the conclusion hereof.

In the drawings: Fig. 1 is a horizontal section of the driving gear of a tractor provided with the improved gearing. Fig. 2 is a section taken on line 2—2 of Fig. 1. Fig. 3 is a detail section of one of the internal gears. Fig. 4 is a section of the idler pinion supporting-plate. Fig. 5 is a detail of one of the pinions driven by the differential gearing.

The improved driving mechanism is illustrated as applied to a pair of co-axial traction-wheels F which are driven respectively through an axle consisting of members $f$. The variable speed mechanism which is driven from a motor in any suitable or well known manner, comprises mechanism which is enclosed in a case A and this mechanism may be of the type set forth in an application serially numbered 252,460, filed by me September 4, 1918. This variable speed mechanism is adapted to impart two speeds in forward direction and one speed in reverse direction to a pinion 6 which meshes with and correspondingly drives a gear-ring 17 which is fixed to the drum 10 of the differential gearing. The differential gearing through which the traction-wheels are driven from gear-ring 17 comprises planetary bevelled pinions 13 mounted on radial arbors 14 in a drum 10 and bevelled gears 15 which mesh with the pinions 13 and are drivably connected to stud-shafts 24 respectively. The inner ends of these stud shafts are squared or suitably formed as at 24' to be driven by the gears 15 respectively and can be withdrawn longitudinally from said gears in disassembling the gearing. Pinions 19 are integrally formed with said shafts 24 respectively to drive the reducing gearing through which the axle-sections and traction-wheels will be respectively driven. Each stud 24 has an enlarged bearing portion 25 in an anti-friction bearing 26.

Sleeves $a$ extend around the axle sections $f$ respectively, enclose spacers $a^{11}$ and are provided with flanges $a'$, which are secured to the casing A by bolts $a^2$. Supporting plates 40 having flanges 41 between flanges $a'$ and the sides of the case A respectively are also rigidly secured in place by said bolts. The hubs of plates 40 carry bearings 26 for the bearing-portions 25 of studshafts 24. Studs 44 are fixed in each of the plates 40 by nuts 45 and each of these studs carries an idler-pinion 46. An anti-friction bearing 47 is interposed between each stud and idler. The outer portions of each idler of the series meshes with an internally toothed gear-ring 48, the hub 49 of which is grooved to receive keys 50 on the inner ends of the axle-sections $f$ respectively. It will be understood that the outer end of each axle-section is connected to drive, in any suitable manner, one of the traction-wheels. The inner end of each axle-member $f$ is provided with a stud 51 which extends into a bearing 52 in one of the pinions 43.

In operation, the pinions 19 will be driven by the differential gearing, as well understood in the art, and each of said pinions will drive one series of idlers 46 which, in turn, will drive the internally toothed gear-ring 48 to drive one of the axles $f$ at a much reduced speed relatively to the differential axles 24.

The invention provides simple enclosed gearing between the co-axial differential gearing and traction-wheels. The internally toothed gear-wheel being located at the inner ends of the axle-members, makes it possible to compactly arrange the reducing and differential gearings.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a tractor, the combination of a pair of co-axial traction wheels, differential gearing located between the traction wheels, axle-members for the traction wheels, each having its outer end secured to drive one of the wheels at its own speed, reducing gearing between the differential and the inner ends of the axle members comprising pinions driven by the differential gearing, internally toothed gear wheels fixed to the inner ends of the axles, and idlers mounted on stationary axes and meshing with said pinions and said gear wheels, a case enclosing the differential gearing and having openings in its sides thru which the differential may be inserted or removed, and side plates removably secured to the case adjacent said openings and on which the idlers are mounted.

2. In a tractor, the combination of a pair of co-axial traction wheels, differential gearing located between the traction wheels, axle-members for the traction wheels, reducing gearing between the differential gearing and the axle-members comprising pinions co-axial with and driven by the differential gearing, internally toothed gear wheels fixed to the inner ends of the axle-members, and idlers mounted on stationary axes and meshing with said pinions and said gear wheels, a case enclosing the differential gearing and having openings in its sides thru which the differential gearing may be inserted or removed, and plates secured to the case and provided with bearings for the differential gearing and on which the idlers are mounted.

3. In a tractor, the combination of a pair of co-axial traction wheels, differential gearing located between the traction wheels, axle members for the traction wheels, reducing gearing between the differential gearing and the axle members comprising pinions co-axial with and driven by the differential gearing, internally toothed gear wheels fixed to the inner ends of the axle members and idlers mounted on stationary axes and meshing with the pinions and the gear wheels, a case enclosing the differential gearing, provided with openings in its sides, plates removably secured to the case and on which the idlers are mounted, and sleeves provided at their inner ends with means to enclose the reducing gearing, the latter being disposed on the outer sides of the plates.

4. In a tractor, the combination of a pair of co-axial traction wheels, differential gearing located between the traction wheels, axle members for said wheels, reducing gearing between the differential gearing and the axle members comprising pinions co-axial with the axle members and driven by the differential gearing, internally toothed gear wheels fixed to the inner ends of said axle members, and idlers meshing with said pinions and gear wheels, a case enclosing the differential gearing, having openings in its sides, plates removably secured to the case and provided with bearings for the differential gearing, and interfitting connections between the pinions and the inner ends of the axle members to retain them in alinement.

5. In a tractor, the combination of a pair of co-axial traction-wheels, differential gearing co-axially mounted with and between the traction-wheels, axle members for the wheels, sleeves around said members, plates secured at the inner ends of said sleeves, and reducing gearing enclosed by said plates and said sleeves comprising pinions driven by the differential gearing, idlers mounted on each plate and meshing with the pinions, and internally toothed gears secured to the axle-members respectively.

6. In a tractor, the combination of a pair of co-axial traction-wheels, differential gearing co-axially mounted with and between the traction-wheels, axle members for the wheels, sleeves around said members, plates secured at the inner ends of said sleeves, reducing gearing enclosed by said plates and said sleeves comprising pinions mounted on said plates and driven by the differential gearing, idlers mounted on each plate and internally toothed gears secured to the axle-members respectively, and meshing with the idlers, and a case enclosing said differential gearing and located between said plates.

7. In a tractor, the combination of a pair of co-axial traction-wheels, differential gearing co-axially mounted with and between the traction-wheels, axle members for the wheels, sleeves around said members, plates at the inner ends of said sleeves, reducing gearing enclosed by said plates and said sleeves comprising pinions driven by the differential gearing, idlers mounted on each plate and internally toothed gears meshing with the idlers and secured to the axle-members respectively, and a case enclosing said differential gearing, said plates being secured between the case and said sleeves.

JOHN B. FOOTE.